United States Patent [11] 3,588,160

[72] Inventor Ralph E. Reiner
 Chestnut Ridge Road, Orchard Park, N.Y. 14127
[21] Appl. No. 761,754
[22] Filed Sept. 23, 1968
[45] Patented June 28, 1971

[54] SHIFTABLE BUMPER
 11 Claims, 11 Drawing Figs.
[52] U.S. Cl. .................................................. 293/73,
 105/449, 280/150, 293/69, 293/99
[51] Int. Cl. .................................................. B60d 1/06,
 B60r 19/04, B61d 23/00
[50] Field of Search............................................ 280/500,
 150; 293/69, 73, 99; 298/38; 5/119; 105/449

[56] References Cited
UNITED STATES PATENTS

| | | | |
|---|---|---|---|
| 584,676 | 6/1897 | Davis............................ | 105/449 |
| 1,330,655 | 2/1920 | Radeleff........................ | 298/38 |
| 1,447,387 | 3/1923 | Heil et al. ..................... | 293/73X |
| 1,463,743 | 7/1923 | Lankston....................... | 298/38 |
| 1,474,929 | 11/1923 | Fagan............................ | 5/119 |
| 1,504,679 | 8/1924 | Dietz............................. | 293/73 |
| 1,515,111 | 11/1924 | Heil et al. ..................... | 293/73X |
| 1,528,688 | 3/1925 | Oler.............................. | 298/38X |
| 1,754,104 | 4/1930 | Hoffman ....................... | 293/73 |
| 3,436,096 | 4/1969 | Rogge........................... | 280/150 |
| 3,471,070 | 10/1969 | Olson............................ | 293/69X |
| 3,488,077 | 1/1970 | Miller............................ | 293/73 |

*Primary Examiner*—Arthur L. La Point
*Assistant Examiner*—Howard Beltran
*Attorney*—Bean and Bean ABSTRACT: A bumper construction including a bumper and mounting means adapted to mount the bumper on the rear of a pickup truck for movement between retracted and rearwardly extending positions; the mounting means having means to releasably lock the bumper in one of its positions, and the bumper having a rearwardly extensible step and a hitch device removably mounted thereon to permit unobstructed access to the step when the latter is in its extended position.

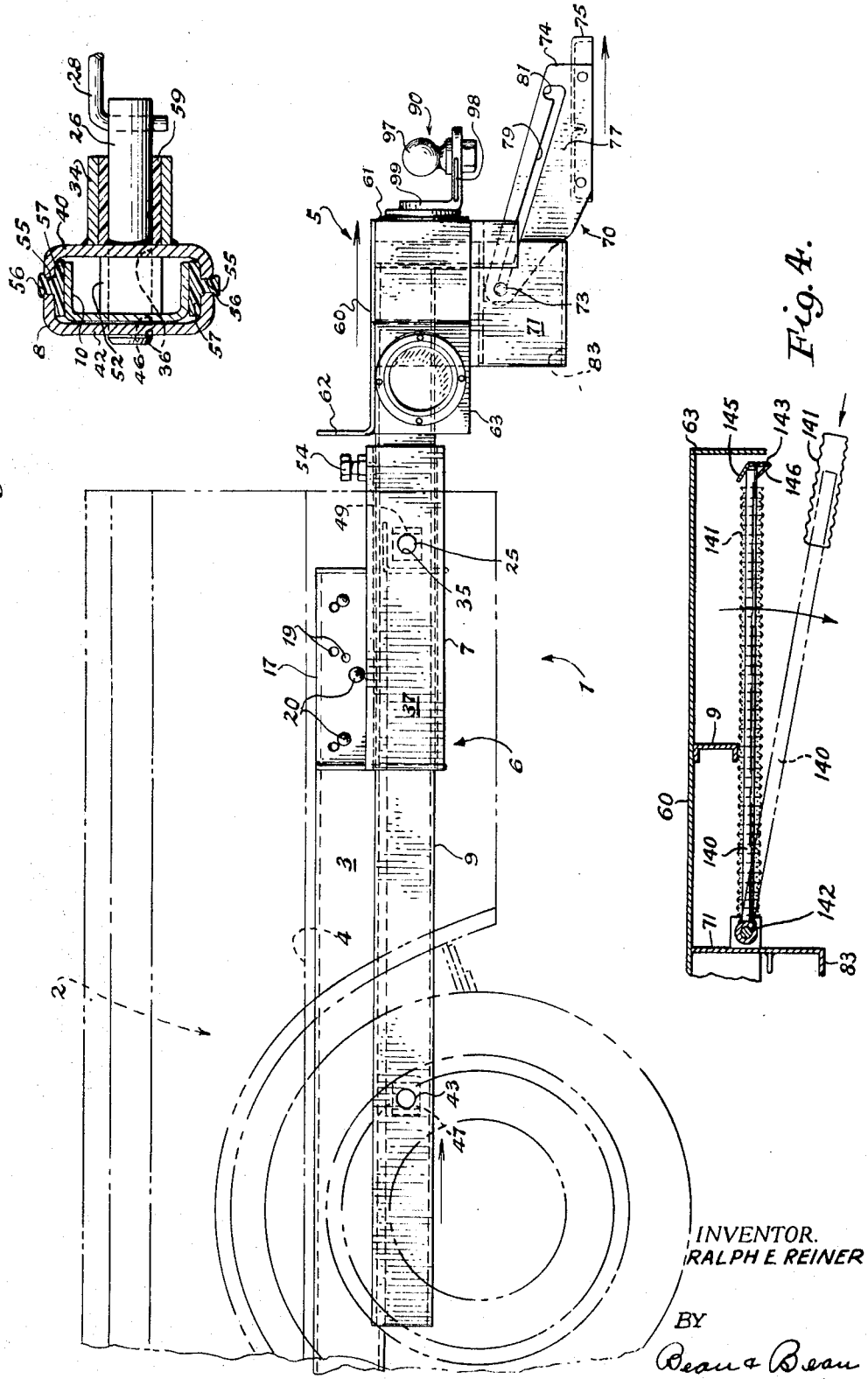

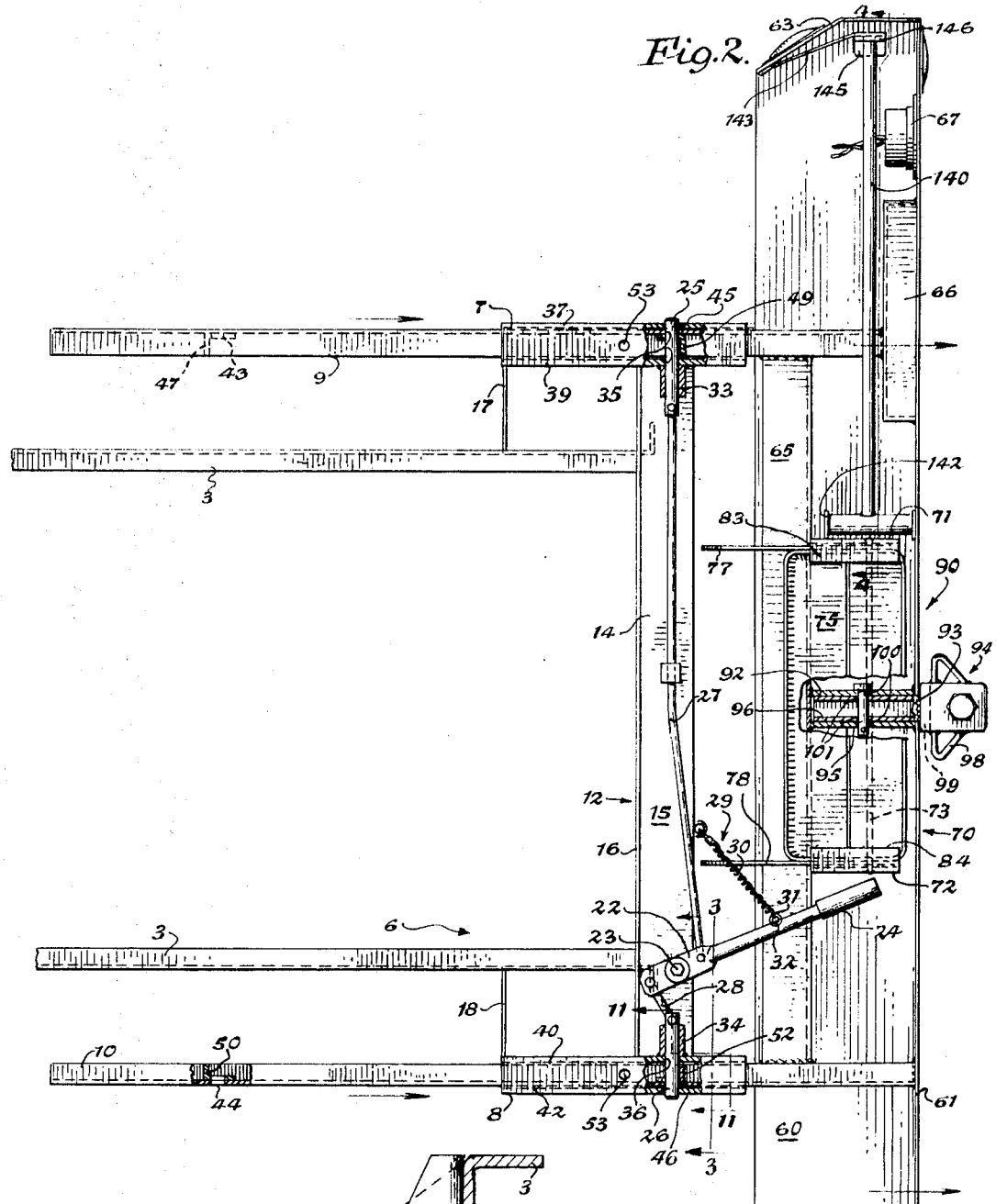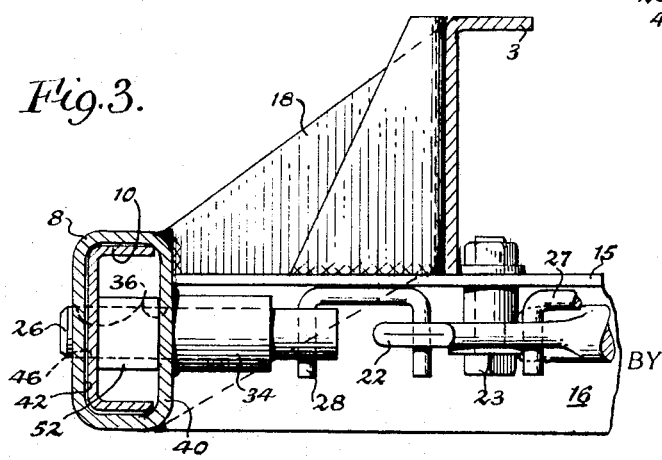

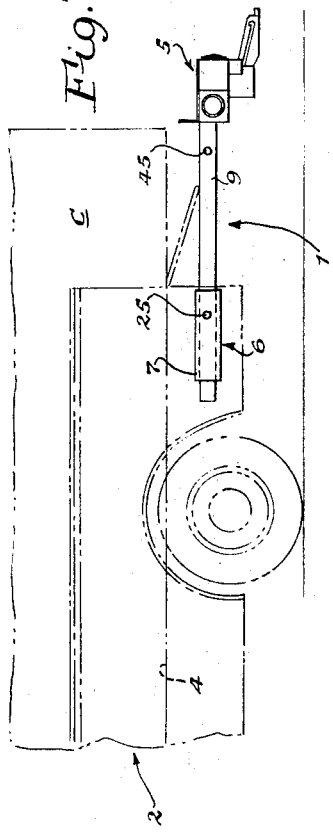
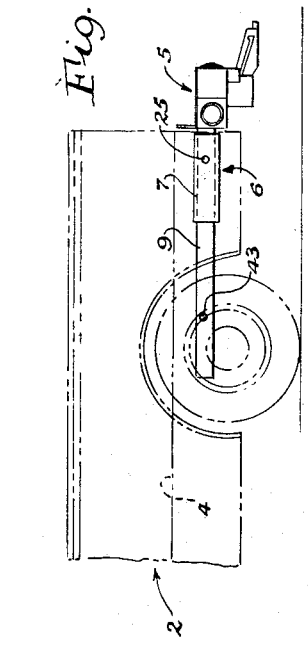
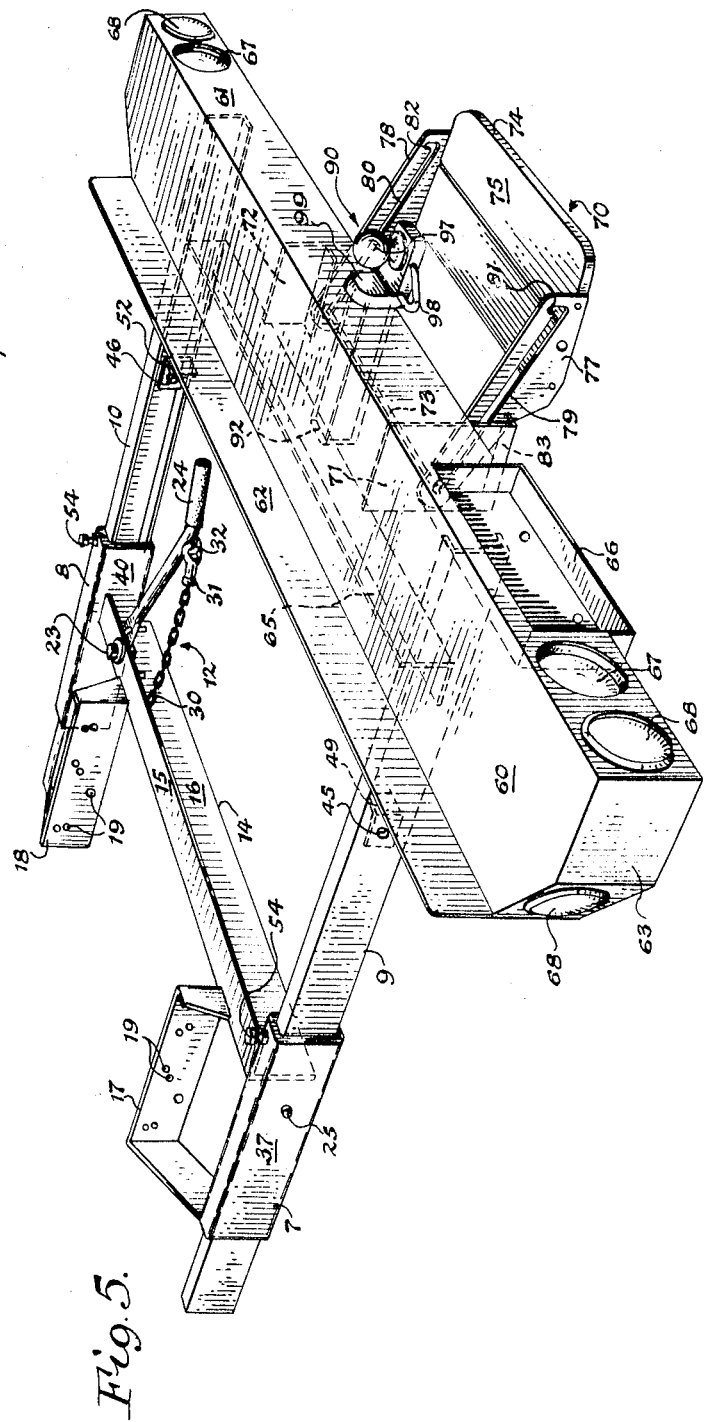

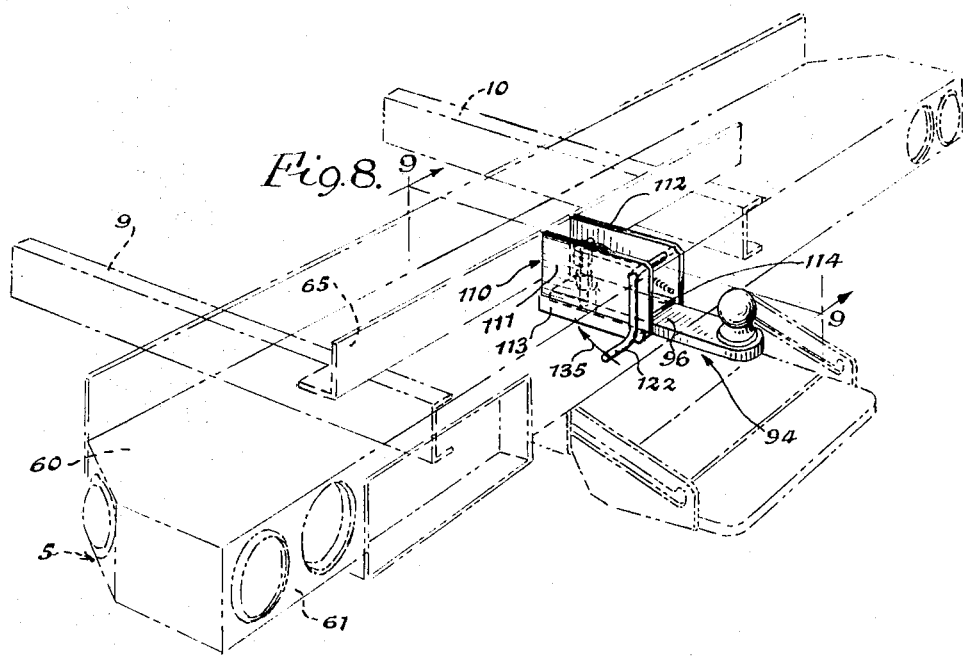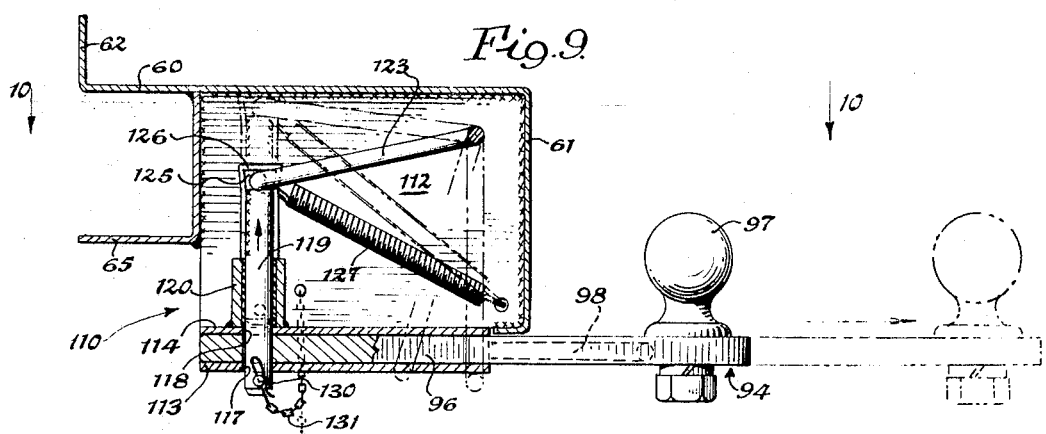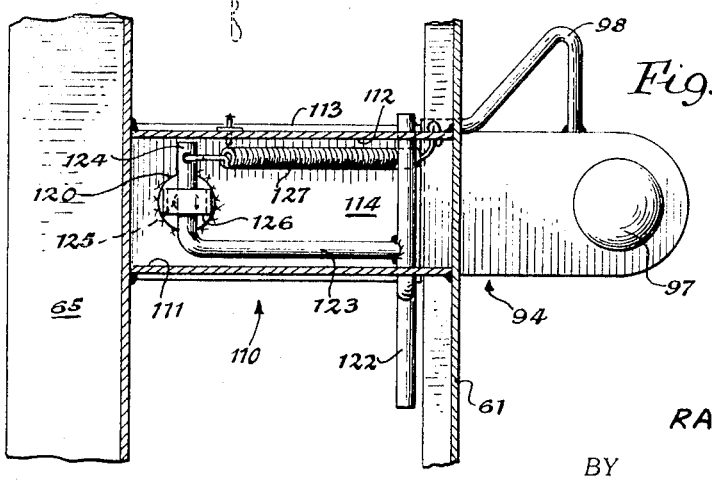

SHIFTABLE BUMPER

BACKGROUND OF THE INVENTION

In recent years, campers of a type adapted to be removably supported on the load carrying platform or bed of a pickup truck have come into wide use for family vacation and weekend outing purposes. Due to the cost of the camper and pickup truck, many families find it necessary to remove the camper during the week or nonvacation periods, so that the truck by itself may be used as conventional transportation or for business. In that most commercially available campers are of such a length that they project rearwardly beyond the truck when installed thereon, it has been found necessary to modify existing truck bumpers by extending same in order to protect the rear of the camper, and provide a convenient place for mounting a trailer hitch. When the camper is removed to permit normal use of the truck, however, the extended bumper prevents the truck from being parked in the normal parking spaces and has resulted in accidents in situations where the driver of the truck forgets that the bumper is disposed substantially beyond the rear of the truck platform. In order to overcome this disadvantage, it has been proposed to provide pickup trucks with extensible rear bumpers which can be moved from a normally retracted position to an extended position whenever a camper is to be transported.

Bumpers of this type are conventionally mounted in either their retracted or extended positions by means of bolts or other semipermanent fasteners, which require a great deal of time to operate. Further, when the bumper is left in one of its positions for a lengthy period of time, fasteners presently in use tend to become frozen in position due to rusting thereof.

It has also become conventional to provide bumpers of the type under consideration with steps in order to afford access to the camper and hitches in order to permit boat or other trailers to be pulled by the truck. One particular disadvantage of presently available bumper constructions is that hitches are permanently mounted adjacent the step, such that an accident is likely to occur when a person, while mounting or descending the bumper step, unintentionally steps on or trips over the hitch.

SUMMARY

The present invention is directed toward a bumper construction which embodies advantages and novel features not present in prior rear bumper arrangements adapted for use with pickup truck carrying campers. More particularly, the present bumper construction incorporates a novel lever operated locking arrangement, which permits the bumper to be easily locked in or released from either of its retracted or extended positions within a matter of a few seconds, even though rusting of the locking arrangement or parts of the bumper associated therewith should occur after extending use.

Additionally, the bumper of the present invention includes a novelly designed bumper step, which may be retracted or extended to facilitate mounting of the bumper when desired.

Further, the bumper construction of the present invention is designed so as to permit a hitch to be attached thereto, when it is desired to pull a boat or other trailer, while permitting such hitch to be easily removed when it is desired to place the bumper step in use.

DRAWINGS

The nature and mode of operation of the bumper construction according to the present invention will be more clearly understood by reference to the following description taken with accompanying drawings, wherein:

FIG. 1 is a side elevational view showing the bumper construction of the present invention mounted on a conventional pickup truck and being in its retracted position;

FIG. 2 is a bottom plan view of the bumper construction of FIG. 1;

FIG. 3 is a sectional view taken generally along the line 3-3 in FIG. 2;

FIG. 4 is a sectional view taken generally along the line 4-4 in FIG. 2;

FIG. 5 is a perspective view of the bumper construction shown in FIG. 1;

FIG. 6 is a side elevation view showing the bumper construction in its retracted position;

FIG. 7 is a side elevation view, with a camper mounted on the vehicle, showing the bumper construction in the extended position;

FIG. 8 is a perspective view illustrating a modified hitch arrangement;

FIG. 9 is a sectional view taken generally along the line 9-9 in FIG. 8;

FIG. 10 is a sectional view taken generally along line 10-10 in FIG. 9; and

FIG. 11 is a sectional view taken generally along line 11-11 in FIG. 2.

DETAILED DESCRIPTION

Upon referring to the drawings, it will be understood that the bumper construction of the present invention, which is generally designated as 1, is adapted to replace a conventional rear bumper and bumper mounting normally provided on a motor vehicle, such as a pickup truck 2 of the type having a body frame 3 on which flat load engaging platform 4 is mounted. Bumper construction 1 generally includes a rear bumper 5 and a mounting arrangement 6, which is adapted to mount bumper 5 on truck frame 3 for movement between a retracted position, which, as indicated in FIGS. 1 and 6, is disposed at a point closely adjacent the rear of pickup truck 2 and an extended position, wherein it may provide protection for the rear of a camper C when the latter is mounted on truck bed 4, as indicated in FIG. 7.

Now referring to FIGS. 1, 2 and 5, it will be seen that bumper mounting arrangement 6 generally includes a pair of guide member 7, 8, which are adapted to slidably receive a pair of parallel rail members 9 and 10 suitably affixed at the rearwardly extending ends thereof to bumper 5; and a locking arrangement 12, which is adapted to releasably lock bumper 5 in either of its normal positions. While other designs are susceptible of use, guide members 7, 8 are preferably of rectangular cross-sectional configuration in order to closely conform to rail members 9, 10, which are in the form of U-shaped channel extrusions.

Preferably, mounted arrangement 6 is fabricated as a single unit by providing a transversely extending brace 14 in the form of angle iron having a horizontally disposed flange portion 15 and a vertically disposed flange portion 16. Brace 14 serves to maintain guide members 7, 8 in a parallel spaced relationship, and cooperates therewith to position locking arrangement 12 and support a pair of generally U-shaped brackets 17, 18 having bore openings 19 provided in the base portions thereof for receiving truck body frame mounting bolts 20. As will be apparent from viewing FIG. 5, mounting brackets 17, 18 serve to tie guide members 7, 8 to the ends of brace 14, such that the guide members are not only maintained in a perpendicular relationship to brace 14, but are prevented from twisting with respect to each other or with respect to truck frame 3 about a line disposed lengthwise of the brace.

In accordance with the preferred embodiment of the present invention, locking arrangement 12 includes a lever 22, which is pivotally supported beneath horizontally disposed brace flange portion 15 by a bolt 23 and provided with an operating handle extension 24; a pair of locking pins 25, 26, which are preferably movably connected to opposite ends of lever 22 by pivotally mounted, connecting link arms 27, 28; and lever position locking means 29 in the form of a link chain 30 which is affixed at one end to brace flange portion 15 and provided on the other end thereof with an eye-type fastener 31 adapted to releasably receive a hook eye 32 affixed to handle extension 24. Although structurally not as desirable as the arrangement shown, locking pins 25, 26 may, however, be in the form of relatively flexible metal rods which are directly pivoted on lever 22.

Referring to FIGS. 2 and 3, it will be seen that locking pins 25, 26 are supported within guide member mounted bearings 33, 34, for reciprocation in alignment with pairs of apertures 35, 36 provided in the vertically extending sidewalls 37, 39, and 40, 42 of guide members 7, 8, respectively.

It will be understood that rail members 9, 10 are each provided with at least two apertures 43, 45 and 44, 46, which are spaced lengthwise of the rail members and adapted to be selectively placed in alignment with guide member apertures 35, 36, respectively, when the rail members are slid within the guide members. When the rail and guide member apertures are so aligned, locking pins 25, 26 may be simultaneously inserted through all of the apertures to lock bumper 5 in either of its normal positions, illustrated in FIGS. 6 and 7, by rotation of handle extension 24 in a counterclockwise direction, as viewed in FIG. 2. By then attaching chain 30 to handle extension 24, locking pins 25, 26 may be positionly maintained in their fully inserted locked positions.

Preferably, rail members 9, 10 are each provided with apertured front and rear L-shaped stops 47, 49 and 50, 52, which are adapted to abut against the ends of locking pins 25, 26, which even in their fully retracted positions project into guide members 7, 8, and cooperate therewith to automatically align the respective rail member apertures with the locking pins.

Further, stops 47 and 50 function to prevent unintentional complete removal of rail members 9, 10 from guide member 7, 8 during use, which otherwise might occur if by negligence locking pins 25, 26 were not inserted into their locking positions or although inserted were not positively locked in place, due to the failure to attach chain 30 to handle extension 24.

To insure against complete withdrawal of the ends of locking pins 25, 26 from within guide members 7, 8 past the point at which they may cooperate with stops 47, 49 and 50, 52, when handle extension 24 is moved, as viewed in FIG. 2, in a clockwise direction, in order to withdraw the locking pins from the rail member apertures, the degree of pivotal movement of lever 22 is limited by engagement thereof with brace flange portion 16 or with a suitable abutment, not shown, provided on brace flange portion 15. It will be understood that during initial assembly of mounting arrangement 6, rail members 9, 10 are placed in position within guide members 7, 8 prior to the mounting of locking arrangement 12.

Guide members 7, 8 are preferably provided with bottom wall drain apertures 53, as indicated in FIG. 2, and top wall mounted threaded adjustment screws 54. Screws 54, when tightened down on rail members 9, 10, serve to prevent rattling thereof within the guide members, which might otherwise occur due to the tendency of the rail members to pivot about locking pins 25, 26. Also, screws 54 permit the rail members to be temporarily locked in selected positions intermediate the normal bumper positions, whereas otherwise, each rail member would have to be provided with a plurality of apertures intermediate those mentioned above.

In FIG. 11, a modified guide member construction is shown, wherein the forwardly and rearwardly disposed ends of each guide member are provided with aligned top and bottom wall apertures 55. Into each aperture 55 is snap fitted a headed projection 56 provided on a bearing block 57 formed of suitable, resilient, friction reducing and corrosion resistant plastic material, such as Nylon. Bearing blocks 57 provide a low friction, corrosion resistant surface on which rail members 9 and 10 may slide, tend to reduce rattling noises during use, and serve to space the rail members from the bottom walls of the guide members in order to permit free drainage of condensate through drain apertures 53, 54. Also, in FIG. 11 the locking pin bearings are shown as having a Nylon or similar plastic sleeve insert to reduce friction and prevent welding together of the parts due to rusting thereof.

As best shown in FIGS. 1, 2 and 5, rear bumper 5 includes an upwardly facing, transversely extending, upper plate 60 having affixed to its rear, front, and end edges, respectively, a vertically downwardly extending rear plate 61, a vertically upwardly extending front plate 62 and vertically downwardly extending end plates 63, 64. The rear end portions of rail members 9, 10 are shown particularly in FIG. 2 as being weld affixed to the lower surface of upper plate 60 and as being braced by a transversely extending angle iron 65. As in conventional bumper constructions, rear plate 61 may be cut away for the purpose of mounting a license plate receiver 66 and rear signal lights 67, and both the rear and end plates may have suitable reflectors 68 mounted thereon.

The bumper construction of the present invention further includes a rearwardly extensible step assembly 70, which is best shown in FIGS. 1, 2 and 5 as including a pair of parallel L-shaped mounting flanges 71, 72, which are affixed at their upper ends to the lower surface of upper plate 60; a transversely extending mounting rod 73, which is end supported on mounting flanges 71, 72; and a step portion 74 including a step 75 and a pair of parallel flange portions 77, 78 affixed to the fore and aft extending side edges thereof. As best shown in FIGS. 1 and 5, flange portions 77 and 78 extend upwardly and forwardly of step 75 and are provided with upwardly and forwardly inclined aligned slot openings 79, 80. Slot openings 79, 80 are adapted to slideably receive rod 73 and are provided adjacent the rearwardly extending lower ends thereof with upwardly extending enlargements 81, 82. When step portion 74 is in its rearwardly extended position, shown in FIGS. 1 and 5, rod 73 is disposed adjacent the forward ends of slots 79, 80 and pivotal movement of the step portion about the axis of shaft 73 is prevented by engagement of the inclined forwardly facing lower edges of flange portions 77, 78 with the facing supporting flange portions 83, 84 of mounting flanges 71, 72. When step portion 74 is in its retracted position, the generally horizontal lower edges of flange portions 77, 78 are supported on supporting flange portions 83, 84 and rod 73 is snapped into slot enlargements 81, 82 to prevent unintentional extension of the step portion.

Again, referring to FIGS. 1, 2 and 5, it will be seen that bumper 5 is also provided with a hitch assembly 90, which includes a hitch mounting in the form of a boxlike guide 92, which is weld affixed to rear plate 61 and extends forwardly thereof in alignment with a rear plate aperture 93; a rear hitch device 94; and hitch locking means in the form of a locking pin 95.

Hitch device 94 includes a forwardly extending boxlike shank portion 96, which is adapted to be inserted through rear plate aperture 93 and be slideably received within mounting guide 92; a rearwardly extending ball hitch 97 including a conventional safety tie rod 98; and intermediate flange stop 99. When shank portion 96 is slid into mounting guide 92, intermediate flange 99 is adapted to abut against rear plate 61 for the purpose of automatically aligning pairs of apertures 100, 101 provided in shank portion 96 and mounted guide 92, respectively, in order to facilitate positioning of locking pin 95 within such apertures. If desired, a cotter pin or other suitable fastener, not shown, may be provided to releasably retain locking pin 95 within apertures 100, 101. By permitting hitch 94 to be selectively removed from bumper 5, accidents occasioned by former arrangements wherein a stationary hitch was mounted about a bumper step may be prevented.

In FIGS. 8—10, a modified hitch construction is shown, wherein a hitch mounting 110 is in the form of a unitary assembly, including a pair of vertically extending, parallel mounting flanges 111, 112, which are joined adjacent the lower edges thereof by a weld affixed generally U-shaped lower flange portion 113 and a weld affixed, flat, upper flange portion 114. Flange portions 113, 114 cooperate to define a mounting guide adapted to slideably receive hitch shank portion 96, and are provided with vertically aligned bore openings 117, 118 adapted to receive a locking pin 119 supported for reciprocation within bushing 120 weld affixed to top flange portion 114. Locking pin 119 may be reciprocated upwardly within bushing 120 to remove it from its lower locking position, shown in FIG. 9, by means of an arrangement including a manually operated crank 122, which is pivotally supported within aligned bore openings provided in mounting flanges 111, 112 and operably interconnected to locking pin 119 by a generally L-shaped crank arm extension 123, whose free end 124 is slideably received within a slot opening 125 defined by the upper end of pin 119 and a weld affixed, generally U-shaped inverted flange portion 126. A tension spring 127, whose ends are connected respectively to mounting flange 112 and free end 124 of extension 123 is employed to normally bias locking pin 119 downwardly into its lower or locking position, which is determined by abutting engagement of the lower ends of U-shaped flange 126 with the upper surface of bushing 120. Locking pin 119 may be positively but releasably retained in its locking position by means of a cotter pin or like fastener 130 carried on safety chain 131. Hitch mounting 110 may be suitably mounted on bumper 5 as by welding mounting flanges 111 and 112 to bumper upper plate 60, rear plate 61 and angle iron brace 65. The hitch device illustrated in FIGS. 8—10 differs from that previously discussed in that shank portion 96 is formed from flat steel bar stock and provided with a vertically extending bore opening 133 through which locking pin 119 is adapted to be inserted. Also, in this embodiment intermediate flange stop 99 is admitted and safety tie rod 98 employed as a stop cooperating with lower flange portion 113 to automatically align shank bore opening 133 with flange bore openings 117 and 118. Additionally, this hitch construction does not require that bumper rear plate 61 be apertured.

When it is desired to remove the hitch illustrated in FIGS. 8-—10, it is merely necessary to remove cotter pin 130 from locking pin 119 and thereafter pivot crank 122 in the direction indicated by arrow 135 in FIG. 8 in order to remove locking pin 119 from shank portion bore opening 133 and thus free the shank portion for removal from the mounting guide. When it is desired to reinstall the hitch device, an operator would again pivot crank 122 in the direction of the arrow 135, and then slide shank 96 into the mounting guide until movement thereof is arrested by engagement of safety tie rod 98 with flange 113. Upon release of crank 122, spring 117 functions to reciprocate locking pin 119 downwardly through the previously aligned shank and flange portion bore openings and return crank 122 to its original position. Thereafter, the cotter pin 130 may be attached to the lower end of the locking pin 119 to positively prevent separation of the parts during use.

In FIGS. 2 and 4, bumper 5 is shown as being provided with a generally T-shaped rod 140 on which a drain hose 141, which is normally provided with campers, may be conveniently stored. Rod 140 is pivotally supported on rear plate mounted bearing 142 for vertical swinging movement from a drain hose storage position to a drain hose removal position shown in full and phantom lines, respectively, in FIG. 4.

In order to releasably retain rod 140 in its storage position, there is provided a clamp in the form of a spring metal or plastic strip 143, which is preferably affixed to bumper end plate 63 and provided adjacent the free end thereof with a pair of integrally formed, laterally bent, upper and lower clamp flanges 145 and 146, respectively. When rod 140 is swung upwardly towards storage position, its free end is adapted to first engage lower clamp flange 146 in order to deflect strap 143 to the right, as viewed in FIG. 4. Thereafter, as rod 140 rides off of lower clamp flange 146 and into engagement with upper flange 145, strap 143 springs back to its original position in order to permit flanges 145 and 146 to clamp the rod in its storage position, wherein the spring clamp positively prevents rattling thereof. When wishing to remove drain hose 141, strap 143 is manually deformed sufficiently to permit lower clamp flange 146 to be removed from underlying engagement with rod 140, whereupon the rod swings downwardly due to the influence of gravity.

While the bumper construction of the present invention has been primarily described with reference to its use on a pickup truck adapted to carry a camper, it may however, be used in extended position for more general purpose of assisting the truck bed to support elongated articles, such as lumber. Further, in that various modifications of the bumper construction of the present invention will likely occur to those skilled in the art, in view of the foregoing description, I wish to be limited only by the scope of the appended claims:

I claim:

1. A bumper construction adapted to be mounted adjacent the rear of a motor vehicle having a body frame on which a load supporting platform is mounted, said bumper construction comprising: a rear bumper having a pair of parallel rail members mounted thereon and extending forwardly therefrom, and bumper mounting means, said mounting means being adapted to be attached to said body frame and including a pair of parallel guide members and a locking arrangement, each guide member being of rectangular cross section presenting a pair of spaced vertical wall portions joined by top and bottom wall portions, each rail member being of U-shaped channel configuration presenting a vertical web disposed adjacent the outer one of said vertical wall portions and upper and lower legs projecting toward the inner vertical wall portion, said webs each having a pair of apertures spaced lengthwise thereof, said guide members each having a pair of aligned apertures in said vertical wall portions thereof, said rail members being supported for reciprocation one within each of said guide members selectively to position said apertures thereof in alignment with said apertures of a guide member associated therewith to define retracted and rearwardly extended positions of said bumper, said locking arrangement including a pair of locking means associated one with each of said guide members and actuating means for actuating said locking means, said actuating means being adapted to move said pair of locking means simultaneously into an inserted position within said rail apertures when aligned with said guide member apertures to lock said bumper in a selected one of said positions and adapted to withdraw said pair of inserted locking means simultaneously to unlock said bumper, and each locking means being of a length to project through both vertical walls of the associated guide member when in said inserted position.

2. A bumper construction according to claim 1, wherein said locking arrangement further includes means to releasably lock said locking means in insertion position.

3. A bumper construction according to claim 1, wherein said actuating means includes lever means pivotally supported on said mounting means and said locking means includes a pair of locking pins one supported for reciprocating movement on each said guide members and rods movably connecting said locking pins to said lever means.

4. A bumper construction according to claim 3, wherein said guide members are provided with bearing means having nylon sleeve liners adapted to support said locking pins for reciprocating movement.

5. A bumper construction according to claim 1, wherein said guide members are of generally rectangular cross-sectional configuration having upper and lower wall portions provided adjacent each end thereof with apertures, and said guide members include friction reducing inserts adapted to slidably engage said upper and lower legs of said rail members, said inserts being snap-fitted into said guide member wall portion apertures.

6. A bumper construction according to claim 1, wherein said rail members include stop means adapted to cooperate with said locking means to align said rail member apertures with said guide member apertures when said rail members are moved to position said bumper in said positions.

7. A bumper construction according to claim 1, wherein said mounting means additionally includes a brace member extending transversely of and being end affixed to said guide members, and a pair of generally U-shaped mounting brackets disposed one adjacent each of said guide members, each of said brackets having a base portion and a pair of leg portions extending from opposite ends thereof, said bracket base portions being attachable to said truck body frame and said leg portions of each said bracket being affixed respectively to said brace member and an adjacent guide member.

8. A bumper construction according to claim 1, wherein said mounting means additionally includes a brace member extending transversely of and being end affixed to said guide members, said actuating means includes a lever pivotally mounted on said brace member and having a manually operable handle extension therefor, said lever being pivotal by said handle extension in opposite directions to effect insertion and withdrawal of said locking means, said locking means includes a pair of locking pins associated one with each of said guide members and connecting rods serving to movably interconnect said pins to said lever, said guide members each including bearing means adapted to slidably support said locking pin associated therewith for insertion and withdrawal from said rail apertures when aligned, and said locking arrangement further includes means carried on said brace member for releasably locking said lever in a locking pin inserting position.

9. A bumper construction according to claim 1, wherein each said guide member is provided with at least one through drain opening disposed in a bottom surface thereof intermediate the ends of said guide member, and each said guide member is adapted to threadably receive a locking screw adjustable to extend inwardly of said guide member into engagement with a rail member received therein.

10. A bumper construction according to claim 1, wherein said bumper includes an upper plate, rear and end plates depending respectively from the rear and end marginal edges of said upper plate; and a hose storage means, said hose storage means including bearing means extending forwardly of said rear plate beneath said upper plate, a rod adapted to slidably receive said hose, said rod being journaled at one end thereof on said bearing means for vertical swinging movement about an axis extending fore and aft of said bumper and having a free end projecting toward one of said bumper end plates, and spring catch means adapted to releasably engage said free end of said rod in order to normally maintain said leg member substantially parallel to said top plate.

11. A bumper construction adapted to be mounted adjacent the rear of a motor vehicle having a body frame on WHICH a load supporting platform is mounted, said bumper construction comprising: a rear bumper having a pair of parallel rail members mounted thereon and extending forwardly therefrom, each of said rail members having at least a pair of apertures spaced lengthwise thereof; and bumper mounting means, said mounting means being adapted to be attached to said body frame and including a pair of parallel guide members and a locking arrangement, said guide members each having at least one aperture provided therein, said rail members being supported for reciprocation one on each said guide members to selectively position said apertures thereof in alignment with said apertures of a guide member associated therewith to define retracted and rearwardly extended positions of said bumper, said locking arrangement including a pair of locking means associated one with each of said guide members and means for actuating said locking means, said actuating means being adapted to simultaneously move said locking means into an inserted position within said rail apertures when aligned with said guide member apertures to lock said bumper in said positions and adapted to simultaneously withdraw said inserted locking means to unlock said bumper, said bumper including a horizontally extending upper plate and a rear plate extending vertically downwardly from the rear marginal edge of said upper plate, and said bumper additionally includes a step assembly, said step assembly including a pair of parallel mounting flanges affixed to the under surface of said upper plate and extending forwardly of said rear plate, said mounting flanges having facing supporting flange surfaces disposed parallel to said upper plate; a rod, said rod being supported adjacent each end thereof on said mounting flanges and being disposed intermediate said upper plate and said supporting surfaces; and a step portion disposed intermediate said mounting flanges and adapted to be moved rearwardly beneath said rear plate to an extended position from a retracted position beneath said upper plate, said step portion having a step surface and a pair of parallel flange portions affixed to the fore and aft extending side edges thereof, said step flange portions extending upwardly and forwardly of said step surface and having upwardly and forwardly inclined aligned slot openings disposed therein, said slot openings being adapted to slidably receive said rod, and said step flange portions being disposed one adjacent each of said mounting flanges and having upwardly and forwardly inclined lower edges in overlying slidable engagement with said supporting flange surfaces thereof, said step flanges being of lengths to project rearwardly beyond said supporting flange surfaces to position said step surface below said supporting flange surfaces when the step assembly is in extended position, said slot openings having an enlargement at one end retaining said step assembly in retracted position with said step surface supported above said supporting flange surfaces.